Nov. 27, 1956     R. B. SEYMOUR     2,771,985

CORROSION RESISTANT STRUCTURE

Filed May 9, 1955     2 Sheets-Sheet 1

*INVENTOR.*
RAYMOND B. SEYMOUR
BY

ATTORNEYS

Nov. 27, 1956  R. B. SEYMOUR  2,771,985
CORROSION RESISTANT STRUCTURE
Filed May 9, 1955  2 Sheets-Sheet 2

INVENTOR.
RAYMOND B. SEYMOUR
BY
ATTORNEYS

United States Patent Office 2,771,985
Patented Nov. 27, 1956

2,771,985

CORROSION RESISTANT STRUCTURE

Raymond B. Seymour, Emmaus, Pa., assignor to The Atlas Mineral Products Company of Pennsylvania, Mertztown, Pa., a corporation of Pennsylvania Application May 9, 1955, Serial No. 506,809

4 Claims. (Cl. 206—2)

This invention relates to a corrosion resistant structure and, more particularly, relates to such a structure providing an inner and outer synthetic resin surface. The structure in accordance with this invention is useful, for example, for containing corrosive material. Thus, for example, in the form of a pipe or a tank, the structure of this invention is useful in the handling of corrosive material such as acids and alkalies.

It is frequently desired to provide a structure having inner and outer surfaces of synthetic resin. Such structures are widely used where resistance to corrosion is an important factor. Generally speaking, such structures are formed of solid synthetic resin with or without a filler interspersed in the resin. Such a structure is obviously a very costly one. The problem of cost is particularly acute where a considerable thickness of resin is required to meet the high specifications of rigidity and bursting strength. Further, where thermoplastic resins are employed, the structure can be used only for low temperature applications due to creep or cold flow and lack of self support at temperatures above about 100° F., varying somewhat, of course, depending upon the thermoplastic resin used.

In accordance with this invention, there is provided a corrosion resistant structure which can be rapidly produced at relatively low cost. The structure of this invention has highly desirable properties of rigidity and bursting strength. Further, it has a high degree of heat resistance being self-supporting and having a high degree of flow resistance at relatively high temperatures.

In accordance with this invention there is provided an outer wall formed of synthetic resin. Spaced from the outer wall is an inner wall of synthetic resin. Between the inner and outer synthetic resin walls, there is sulfur. Generally speaking, the inner and outer walls will have a thickness of from about 5 mils to about 100 mils and the distance between the inner and outer walls will be from about ⅛″ to 2.5″.

The inner and outer walls may be made of any suitable corrosion resistant thermoplastic or thermosetting synthetic resin. Combinations of synthetic resins may also be employed. By way of more specific example, the following resins are satisfactory: vinyl resins such as polyvinyl chloride, vinyl chloride-acetate copolymer, vinyl chloride-vinylidene chloride copolymer, vinylidene chloride-acrylonitrile copolymer; furfuryl resin such as polyfurfuryl alcohol, the reaction product of furfuryl alcohol and furfural, the reaction product of furfural and ketones, such as acetone, the reaction product of furfuryl alcohol and formaldehyde; epoxy resins such as, for example, bisphenol-epichlorhydrin and bisphenol-glycerol reaction products; mixtures of epoxy resins with liquid thiokol products; a phenolic resin such as a phenol-formaldehyde and phenol-furfural; a cellulosic resin such as, for example, cellulose acetate and cellulose acetate butyrate; a styrene resin such as polystyrene or a blend of an acrylonitrile-styrene copolymer and an acrylonitrile-butadiene copolymer or a blend of polystyrene with other butadiene copolymers; polychloro ethers; polymonochlorotrifluoroethylene; polytetrafluoroethylene; an acrylic resin such as polymethyl methacrylate; polyethylene or a substituted polyethylene such as chlorosulfonated polyethylene.

By way of further example, the inner and outer walls may be formed of a polyester resin. Any polyester resin can be used, that is, any resin having a substantially 100% polymerizable mix of a liquid dihydric alcohol ester of an ethylene alphabetadicarboxylic acid and a liquid monomeric unsaturated polymerizable compound in which the unsaturation is due to a single terminal ethylenic group which is attached to a negative radical in which the ester aforesaid is soluble and with which it is copolymerizable in the presence of a peroxy polymerization catalyst. Reference may be had to "Modern Plastics Encyclopedia", published by Plastics Catalogue Corp., 122 E. 42nd Street, New York 17, N. Y. for typical polyester resins and the manner of their production. Thus, a composition comprising a substantially linear polyhydric alcohol ester of an unsaturated polybasic acid material of the maleic type and a substituted-ethylene body of resin forming characteristics which are copolymerizable and miscible with the polyhydric alcohol ester. Thus, for example, the composition may be diethylene glycol maleate or diethylene glycol fumarate having incorporated therewith vinyl acetate, amylacrylate, or styrene. The curing of such a maleic substituted ethylene composition will be accelerated by using a curing catalyst such as benzoyl peroxide, phthalyl peroxide or air blown dioxane. Such thermosetting resins are well known in the art and reference may be made to Patent No. 2,255,313, issued September 9, 1941 to Carleton Ellis for further information relative to them. Reference may also be had to British Patents Nos. 540,168 and 540,169 for other exemplary polyester resins. A styrene solution of esters formed from fumaric acid and the reaction product of bisphenol A and ethylene or propylene oxide (U. S. Patent 2,662,069) and hexachlorocyclopentadiene polyesters are further exemplary.

In forming the inner and outer walls, the resin may be filled, if desired, with any conventional filler such as, for example, glass fibers, woven fiber glass fabric, asbestos fibers, finely divided carbon or silica.

The sulfur may be plasticized or unplasticized as desired. If it is desired to plasticize the sulfur, this can be readily accomplished with, for example, polyethylene sulfide benzothiazyl disulfide, polyolefine sulfide, an alkalene disulfide, such as isobutylene disulfide or octene disulfide, an alkyl disulfide such as dodecyl disulfide or octyl disulfide or a lower alkyl thiuram disulfide such as tetramethylthiuram disulfide or tetrabutylthiuram disulfide. Where used, the plasticizer will be present in an amount of from about 0.2% to 15% by weight of the sulfur.

The structure can be reinforced through the inclusion of a reinforcing material in the sulfur. The reinforcing material may take the form of, for example, finely divided silica or carbon or fibers of, for example, glass or asbestos. Sheets of material may also be placed in the sulfur to reinforce the structure. The sheet may be, for example, a metal sheet such as a steel or aluminum sheet or a woven textile sheet formed of fiber glass, cotton, nylon, rayon, ramie or the like.

In order to achieve superior adhesion between the sulfur and the inner and outer walls, it is preferred to coat the surfaces of these walls which face the sulfur with an epoxy resin such as, for example, bisphenol-epichlorhydrin or bisphenol-glycerol where the walls are not formed of an epoxy resin. Similarly, where reinforcing metal is used in the sulfur, it is preferred to coat the metal with an epoxy resin.

The structures in accordance with this invention are readily formed and it will be obvious that they are highly advantageous in that the final forming steps can be carried out at the site where the product is to be used. In accordance with this invention, the synthetic resin inner and outer walls are first formed using conventional techniques well known to the art. Thus, for example, where tubular objects are to be formed, the inner and outer wall sections can be formed by extrusion. Alternatively, they can be formed by wrapping a calendered sheet of the selected synthetic resin about a mandrel of appropriate size and heat sealing the thus wrapped sheet to form a unitary tube. Again, where it is desired to reinforce the inner and outer walls, they can be formed by impregnating a fabric, for example, a woven glass fabric with the desired synthetic resin, wrapping the impregnated fabric on a mandrel and heat sealing into a unitary tube.

Similarly, either or both the inner and outer walls can be formed of a plurality of separate pieces which are heat welded together or cemented together. This technique is particularly satisfactory where forming, for example, a tank. Thus, for example, a circular tank can readily be formed by heat drawing an extruded sheet of synthetic resin into a circular shape of desired diameter and then forming on top of the base a sheet of synthetic resin into a cylindrical shape, the sheet being cemented together at its upstanding edges with a synthetic resin cement and similarly cemented to the base. A similar section is then similarly formed, but of a predetermined smaller size, and placed within but spaced from the first section. It will be obvious that heat welding can be substituted for synthetic resin cement for securing the parts together.

The thus fabricated walls made by conventional techniques are placed so as to be spaced apart leaving a void between the walls. While being maintained in this position, the space is filled by pouring into the void plasticized or unplasticized molten sulfur. During the pouring process, it is preferred to provide a substantially rigid support for the exterior of the outer wall and for the interior of the inner wall. After the sulfur has hardened and the supports removed, the structure in accordance with this invention is finished.

The invention will be further clarified by reading the following description in conjunction with the drawings in which.

Figure 1:
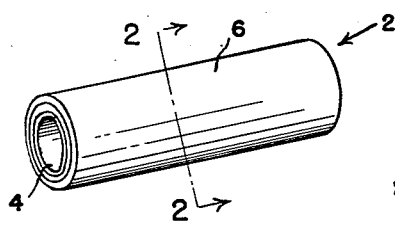
Figure 1 is a side perspective view of a pipe in accordance with this invention.
Figure 2:
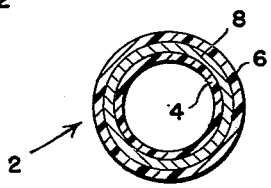
Figure 2 is a section taken on the plane indicated by the line 2—2 in Figure 1.

As shown in Figures 1 and 2, a pipe 2 in accordance with this invention has an inner lining tube 4 of synthetic resin and an outer synthetic resin tube 6. The space between tubes 4 and 6 is filled with sulfur 8.

Figure 5:
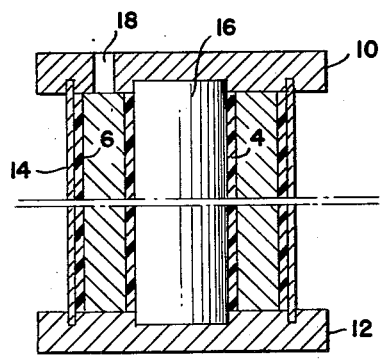
Figure 5 is a vertical section illustrating apparatus useful for forming a pipe in accordance with this invention.

The pipe 2 in accordance with this invention can readily be formed as shown in Figure 5. An upper jig 10 and a lower jig 12 can be used to accurately position a cylindrical metal support member 14 and a mandrel 16. The inner lining tube 4 is supported on mandrel 16 while the outer tube 6 is supported by the cylindrical member 14. The sulfur can be introduced through opening 18 in upper jig 10.

Figure 3:
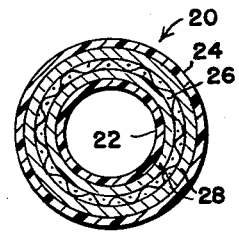
Figure 3 is a section through a pipe in accordance with this invention.

As shown in Figure 3, a reinforced tube 20 can be made. Tube 20 has an inner synthetic resin lining tube 22 and an outer synthetic resin lining tube 24. A metal screen reinforcing tube 26 is positioned between tubes 22 and 24 and all the void spaces between metal screen 26 and tubes 22 and 24 are filled with sulfur 28.

Figure 4:
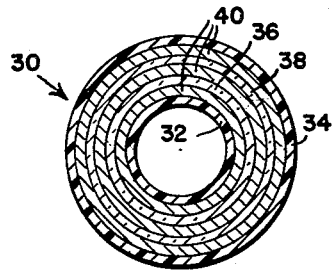
Figure 4 is a section through a pipe in accordance with this invention.

A still further embodiment is illustrated in Figure 4. A pipe 30 has an inner synthetic resin lining tube 32 and an outer synthetic resin tube 34. Between tubes 32 and 34 are positioned, spaced apart, glass woven fabric tubes 36 and 38. The void spaces between tubes 32, 36, 38 and 34, respectively, are filled with sulfur 40.

Figure 6:
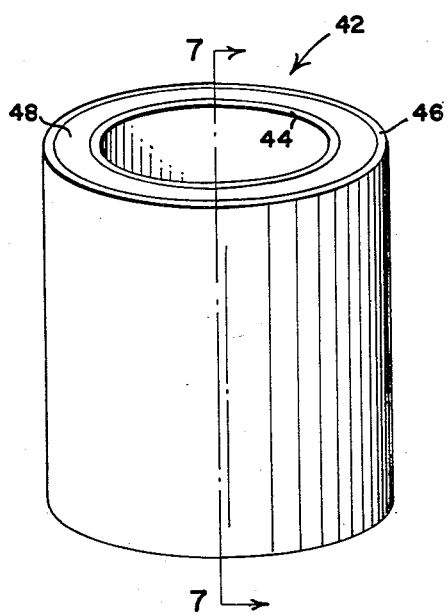
Figure 6 is a front perspective view of a tank in accordance with this invention.
Figure 7:
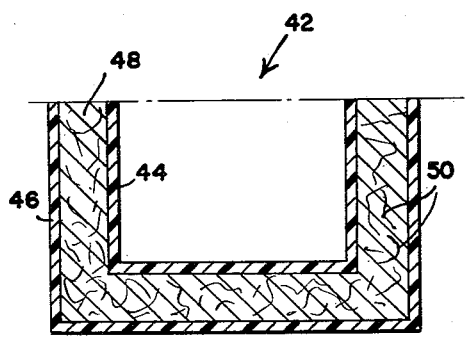
Figure 7 is a section taken on the plane indicated by the line 7—7 in Figure 6.

A tank 42 in accordance with this invention is illustrated in Figures 6 and 7. Tank 42 has an inner synthetic resin lining 44 and an outer synthetic resin lining 46. The space between linings 44 and 46 is filled with sulfur 48. For added strength, sulfur 48 is filled with glass fibers 50.

Figure 8:
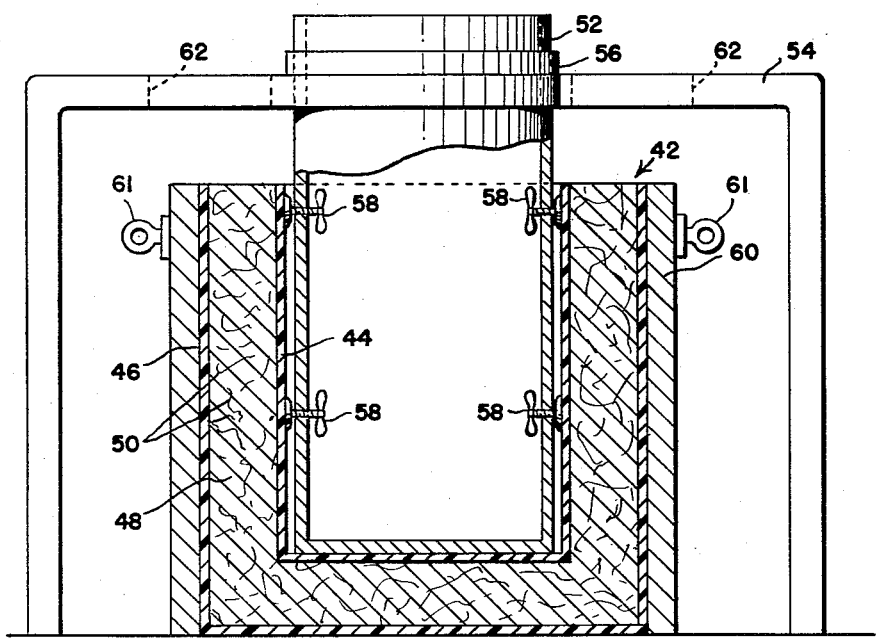
Figure 8 is a vertical section through apparatus useful for making a tank in accordance with this invention.

The tank 42 can readily be formed as shown in Figure 8. A tubular member 52 passes through a support member 54 and has a flange 56 which is adapted to engage the support member 54. Member 52 is provided with screw clamps 58 which are screwed outwardly to engage and hold inner lining 44. A metal pipe 60 surrounds outer lining 46. Sulfur, containing a dispersion of glass fibers, is then introduced through openings 62 in support 54 to fill the void space between linings 44 and 46. The sulfur is then permitted to harden and then screw clamps 58 are loosened up permitting the raising of support 54 and tubular member 52. Metal pipe 60 is then raised using pad eyes 61, 61 to remove it from about outer lining 46.

Figure 9:
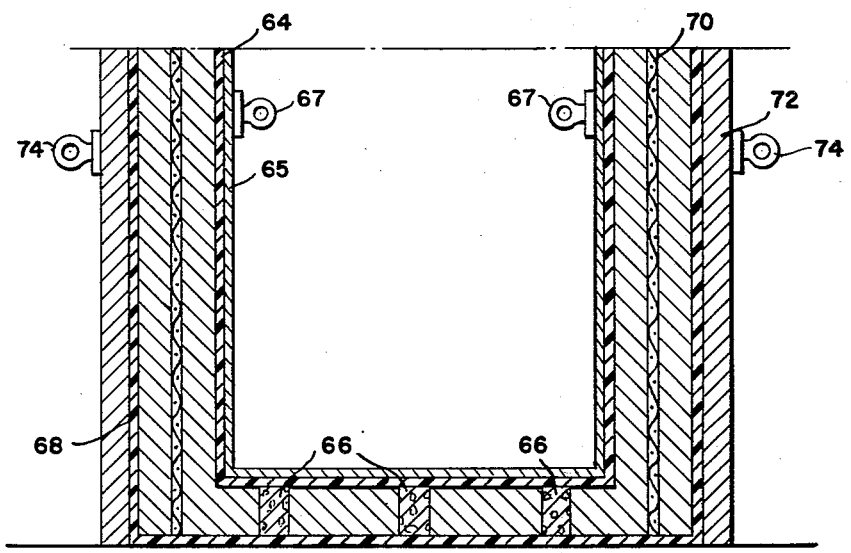
Figure 9 is a vertical section of a tank in accordance with this invention.

Figure 9 illustrates the formation of an alternative tank with an alternative method. As shown in Figure 9, an inner lining 64 of synthetic resin is supported by a plurality of tiles 66 which, in turn, rest on the bottom of an outer lining 68 of synthetic resin. A metal member 65 having pad eyes 67 supports the inner face of lining 64. A circular metal screen 70 is disclosed between linings 64 and 68 and rests on the bottom of lining 68. A metal tube 72 surrounds the upstanding portion of outer lining 68. As illustrated, sulfur has been poured between linings 64 and 68 to fill all of the void space. After the sulfur has hardened, the metal tube 72 is lifted using pad eyes 74, 74 to leave the fully formed tank in accordance with this invention.

The invention will be further clarified by the following examples:

*Example 1*

A blend of an acrylonitrile-styrene copolymer and an acrylontrile-butadiene copolymer is extruded with a thickness of 25 mils, and an outside diameter of 3½". A tube of similar material with similar thickness and an outside diameter of 3.1" is also extruded and the smaller tube is inserted within the larger tube. The internal tube is held in place by a mandrel and the outside tube is confined by means of a metal shell. The components are placed in an upright position and the inner tube is centered in respect to the outer tube. A cylindrical metal screen is inserted between the inner and outer tubes and the void space is filled by pouring a molten plasticized sulfur cement consisting of 58% sulfur, 30% fine silica, 7% asbestos, 1% carbon and 4% benzothiazyl disulfide. The sulfur is cooled to room temperature.

The resulting pipe is usable within a few minutes and is then removed from the mandrel and retaining shell. Subsequent bursting tests at 150° F. showed that this pipe did not break when subjected to a pressure of 500 p. s. i. even after 1,000 hours of continuous pressure. In contrast, a 3" pipe with the same plastic material throughout, that is, one having the same total thickness, had a rate of working pressure of less than 100 p. s. i. at 150° F.

*Example 2*

The procedure of Example 1 was repeated substituting unplasticized polyvinyl chloride for the acrylonitrile copolymer.

*Example 3*

A steel wire mesh was formed in a circle having a diameter of 4.5" and one layer of a lightweight glass mat was wrapped loosely around this circular form. This unit was then placed around an unplasticized polyvinyl chloride pipe with an inner diameter of 4" and a thickness of 30 mils. This built-up unit was then placed within a 30 mil thick Type II polyvinyl chloride tube with an outer diameter of 6". The space was then filled with a hot sulfur cement consisting of 62.4% sulfur, 1% carbon and 36.6% graded silica and then cooled.

This pipe had an impact resistance of 15 ft. lbs. compared with 2 ft. lbs. for a vitrified clay pipe of similar size. Its resistance to burst was 400 p. s. i. compared with 150 p. s. i. for vitrified clay pipe. However, the latter was pervious to liquid at 25 p. s. i. while the new pipe was completely impervious.

*Example 4*

A woven glass fabric is wrapped on a mandrel with an outer diameter of 0.957" and impregnated with a solution of unsaturated polyester resin in styrene and allowed to cure. A similar tube is prepared on a mandrel having an outer diameter of 1.275". This pipe is built up so that its outer diameter is 1.315". The smaller pipe is placed within the larger, the void space is filled with hot sulfur and the sulfur cooled until solid.

*Example 5*

A filled furan resin pipe made by extrusion or spinning and having an inner diameter of 3.50" is placed outside of another thin walled pipe of the same material. The inner pipe having an outer diameter of 2.842". The space between the two pipes is filled with hot sulfur and the sulfur cooled until hard at room temperature.

*Example 6*

A 35 mil thick sheet of unplasticized polyvinyl chloride is wrapped around a tube having an outer diameter of 5.760" and the overlaps are heat-sealed. Another tube is made from a sheet of the same material with a thickness of 40 mils which is wrapped around a tube having an outer diameter of 6.585". The overlaps are cemented with an epoxy cement. The space between the two tubes is filled with lightly packed glass fibers and molten sulfur is poured in the space in order to form a solid reinforcement. This pipe, when joined with shorter lengths of pipe made in the same manner with an inner diameter of 6.627" and cemented with a solution of polyvinyl chloride in tetrahydrofuran.

*Example 7*

A 60 mil thick extruded sheet of acrylonitrile copolymer is cut so that when heat drawn, it becomes the base of a circular tank 2' in diameter. A sheet of similar material is cut so that it measures 3' in width and 6¾' in length. This sheet is then formed in a cylinder with a 2' diameter and cemented with an epoxy resin cement. This cylinder is then cemented to the base and the thin walled section is placed within a similar vessel constructed of the same material with a thickness of 30 mils; the difference between the two diameters being 2". The bottom of the inner tank is prevented from touching the bottom of the outer tank by the use of tiles having a thickness of 2" which are placed on the bottom of the other tank. The space between the two vessels is then filled with a molten sulfur cement consisting of 60% sulfur, 25% carbon, 10% asbestos and 5% benzothiazyl disulfide. This tank was satisfactory for holding 10% sulfuric acid at 150° F.

*Example 8*

A 30 mil calendered sheet of unplasticized polyvinyl chloride was heat welded with welding rod of the same material in order to form a rectangular tank 2' high, 2' wide and 2½' long. A tank of similar material measuring 2' 2" deep, 2' 4" wide and 2' 10" long was heat welded. 2" tile was placed in each corner of the outer tank and the inner tank was inserted. The space between the two tanks was filled with hot sulfur which was then cooled.

*Example 9*

A 15 mil calendered sheet of unplasticized polyvinyl chloride was placed around a mandrel with a diameter of 3¼" and heat-welded to form a tube. A pre-cut piece of fiber glass woven textile was passed through a bath of catalyzed polyester resin and then wrapped around the polyvinyl chloride tube. A similar tube was made by wrapping around a larger mandrel so that its exterior diameter was 4". Two layers of wire screening were placed in the void formed when the two tubes were nested concentrically and this space was filled with a molten sulfur cement consisting of 60% sulfur, 20% carbon, 15% silica and 5% benzothiazyl disulfide. This pipe did not burst when subjected to 350 p. s. i. pressure at 125° F. even after 1 month of continuous service.

It is not desired to be limited except as set forth in the following claims.

What is claimed is:

1. A structure adapted to contain corrosive fluids comprising an inner synthetic resin wall having a thickness of from about 5 to about 100 mils, an outer synthetic resin wall having a thickness of from about 5 to about 100 mils and spaced from said inner wall a distance of from about ⅛" to about 2.5" and sulfur between said inner and outer walls.

2. A structure adapted to contain corrosive fluids comprising an inner synthetic resin tube having a thickness of from about 5 to about 100 mils, an outer synthetic resin tube having a thickness of from about 5 to about 100 mils and spaced from said inner tube a distance of from about ⅛" to about 2.5" and sulfur between said inner and outer tubes.

3. A structure adapted to contain corrosive fluids comprising an inner thermoplastic synthetic resin wall having a thickness of from about 5 to about 100 mils, an outer synthetic resin wall having a thickness of from about 5 to about 100 mils and spaced from said inner wall a distance of from about ⅛" to about 2.5" and sulfur between said inner and outer walls.

4. A structure adapted to contain corrosive fluids comprising an inner thermoplastic synthetic resin wall having a thickness of from about 5 to about 100 mils, an outer thermoplastic synthetic resin wall having a thickness of from about 5 to about 100 mils and spaced from said inner wall a distance of from about ⅛" to about 2.5" and sulfur between said inner and outer walls.

References Cited in the file of this patent

UNITED STATES PATENTS

| | | |
|---|---|---|
| 918,649 | Betts | Apr. 20, 1909 |
| 1,614,737 | Kobbe | Jan. 18, 1927 |
| 2,364,014 | West | Nov. 28, 1944 |
| 2,604,426 | Beekman | July 22, 1952 |